United States Patent
Lee et al.

(10) Patent No.: US 12,284,657 B2
(45) Date of Patent: Apr. 22, 2025

(54) METHOD AND APPARATUS FOR RESOURCE REQUEST IN WIRELESS COMMUNICATION SYSTEM

(71) Applicant: LG ELECTRONICS INC., Seoul (KR)

(72) Inventors: Youngdae Lee, Seoul (KR); Giwon Park, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 438 days.

(21) Appl. No.: 17/765,982

(22) PCT Filed: Sep. 23, 2020

(86) PCT No.: PCT/KR2020/012835
§ 371 (c)(1),
(2) Date: Apr. 1, 2022

(87) PCT Pub. No.: WO2021/066382
PCT Pub. Date: Apr. 8, 2021

(65) Prior Publication Data
US 2022/0353902 A1    Nov. 3, 2022

(30) Foreign Application Priority Data
Oct. 3, 2019   (KR) .................. 10-2019-0122699

(51) Int. Cl.
*H04W 72/23*    (2023.01)
*H04L 1/08*    (2006.01)
(Continued)

(52) U.S. Cl.
CPC ........... *H04W 72/23* (2023.01); *H04L 1/08* (2013.01); *H04L 1/1812* (2013.01); *H04W 28/0268* (2013.01); *H04W 72/543* (2023.01)

(58) Field of Classification Search
CPC ............ H04W 72/23; H04W 72/543; H04W 28/0268; H04L 1/08; H04L 1/1812
See application file for complete search history.

(56) References Cited

U.S. PATENT DOCUMENTS

2019/0158231 A1*  5/2019  Zhang .................. H04L 1/203
2021/0028891 A1*  1/2021  Zhou .................... H04W 4/40
(Continued)

FOREIGN PATENT DOCUMENTS

WO     2018016157    1/2018

OTHER PUBLICATIONS

Vivo, "Discussion on mode 1 resource allocation mechanism," 3GPP TSG-RAN WG1 #97, R1-1906138, May 2019, 15 pages.
(Continued)

*Primary Examiner* — Xuan Lu
(74) *Attorney, Agent, or Firm* — LEE, HONG, DEGERMAN, KANG & WAIMEY

(57) ABSTRACT

The present disclosure relates to resource request in wireless communications. According to an embodiment of the present disclosure, a method performed by a first wireless device configured to operate in a wireless communication system, the method comprises: receiving, from a network, one or more sidelink grants; creating a data unit based on the one or more sidelink grants; performing a transmission of the data unit to a second wireless device by using the one or more sidelink grants; transmitting, to the network via a physical uplink control channel (PUCCH), a resource request for a retransmission of the data unit based on a quality of service (QoS) requirement of the data unit; receiving, from the network, one or more sidelink grants for the retransmission of the data unit; and performing the
(Continued)

retransmission of the data unit to the second wireless device by using the one or more sidelink grants for the retransmission of the data unit.

11 Claims, 19 Drawing Sheets

(51) Int. Cl.
*H04L 1/1812* (2023.01)
*H04L 1/1822* (2023.01)
*H04L 1/1867* (2023.01)
*H04W 28/02* (2009.01)
*H04W 72/543* (2023.01)
*H04W 92/18* (2009.01)

(56) References Cited

U.S. PATENT DOCUMENTS

2022/0007338 A1* 1/2022 Zhao ............... H04W 72/1263
2022/0061055 A1* 2/2022 Freda ............... H04W 72/1263
2022/0104218 A1* 3/2022 Zhang ............... H04W 72/21
2022/0216945 A1* 7/2022 Xu ............... H04L 1/1854

OTHER PUBLICATIONS

ITL, "Sidelink HARQ operation for NR V2X," 3GPP TSG-RAN WG2 #105, R2-1902074, Feb. 2019, 4 pages.
Catt, "Sidelink SR/BSR in Uu Interface," 3GPP TSG-RAN2 Meeting #105bis, R2-1903169, Mar. 2019, 7 pages.
Ericsson, "Feature lead summary #2 on Resource allocation for NR sidelink Mode 1," 3GPP TSG-RAN WG1 Meeting #97, R1-1907774, May 2019, 29 pages.
3rd Generation Partnership Project (3GPP), "Technical Specification Group Radio Access Network; Evolved Universal Terrestrial Radio Access (E-UTRA); Medium Access Control (MAC) protocol specification (Release 15)," 3GPP TS 36.321 V15.6.0, Jun. 2019, 133 pages.
PCT International Application No. PCT/KR2020/012835, International Search Report dated Dec. 23, 2020, 2 pages.

* cited by examiner

METHOD AND APPARATUS FOR RESOURCE REQUEST IN WIRELESS COMMUNICATION SYSTEM

CROSS-REFERENCE TO RELATED APPLICATIONS

This application is the National Stage filing under 35 U.S.C. 371 of International Application No. PCT/KR2020/012835, filed on Sep. 23, 2020, which claims the benefit of earlier filing date and right of priority to Korean Application No. 10-2019-0122699, filed Oct. 3, 2019, the contents of which are all incorporated by reference herein in their entirety.

TECHNICAL FIELD

The present disclosure relates to resource request in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In order for a UE to transmit data, there might be some cases the UE needs to transmit a resource request to transmit the data. For example, the UE may need to transmit a scheduling request (SR) and/or a buffest status report (BSR) to a network, to transmit data to the network in uplink. For another example, the UE may need to transmit a sidelink (SL) SR and/or a SL BSR to a network, to transmit data to another UE in sidelink. The resource request may also be needed when performing a retransmission of the data.

SUMMARY

1. Technical Problem

An aspect of the present disclosure is to provide method and apparatus for a resource request in a wireless communication system.

Another aspect of the present disclosure is to provide method and apparatus for requesting a resource for a sidelink transmission in a wireless communication system.

Another aspect of the present disclosure is to provide method and apparatus for requesting a resource for a retransmission in sidelink in a wireless communication system.

2. Technical Solution

According to an embodiment of the present disclosure, a method performed by a first wireless device configured to operate in a wireless communication system, the method comprises: receiving, from a network, one or more sidelink grants; creating a data unit based on the one or more sidelink grants; performing a transmission of the data unit to a second wireless device by using the one or more sidelink grants; transmitting, to the network via a physical uplink control channel (PUCCH), a resource request for a retransmission of the data unit based on a quality of service (QoS) requirement of the data unit; receiving, from the network, one or more sidelink grants for the retransmission of the data unit; and performing the retransmission of the data unit to the second wireless device by using the one or more sidelink grants for the retransmission of the data unit.

According to an embodiment of the present disclosure, a wireless device in a wireless communication system comprises: a transceiver; a memory; and at least one processor operatively coupled to the transceiver and the memory, and configured to: control the transceiver to receive, from a network, one or more sidelink grants, create a data unit based on the one or more sidelink grants, control the transceiver to perform a transmission of the data unit to a second wireless device by using the one or more sidelink grants, control the transceiver to transmit, to the network via a physical uplink control channel (PUCCH), a resource request for a retransmission of the data unit based on a quality of service (QoS) requirement of the data unit, control the transceiver to receive, from the network, one or more sidelink grants for the retransmission of the data unit, and control the transceiver to perform the retransmission of the data unit to the second wireless device by using the one or more sidelink grants for the retransmission of the data unit.

According to an embodiment of the present disclosure, a processor for a wireless device in a wireless communication system is configured to control the wireless device to perform operations comprising: receiving, from a network, one or more sidelink grants; creating a data unit based on the one or more sidelink grants; performing a transmission of the data unit to a second wireless device by using the one or more sidelink grants; transmitting, to the network via a physical uplink control channel (PUCCH), a resource request for a retransmission of the data unit based on a quality of service (QoS) requirement of the data unit; receiving, from the network, one or more sidelink grants for the retransmission of the data unit; and performing the retransmission of the data unit to the second wireless device by using the one or more sidelink grants for the retransmission of the data unit.

According to an embodiment of the present disclosure, a computer-readable medium having recorded thereon a program for performing each step of a method on a computer is provided. The method comprises: receiving, from a network, one or more sidelink grants; creating a data unit based on the one or more sidelink grants; performing a transmission of the data unit to a second wireless device by using the one or more sidelink grants; transmitting, to the network via a physical uplink control channel (PUCCH), a resource request for a retransmission of the data unit based on a quality of service (QoS) requirement of the data unit; receiving, from the network, one or more sidelink grants for the retransmission of the data unit; and performing the retransmission of the data unit to the second wireless device by using the one or more sidelink grants for the retransmission of the data unit.

According to an embodiment of the present disclosure, a method performed by a base station (BS) in a wireless communication system, the method comprises: transmitting, to a first wireless device, one or more sidelink grants used for the first wireless device to perform a transmission of a data unit to a second wireless device; receiving, from the first wireless device via a physical uplink control channel (PUCCH), a resource request for a retransmission of the data unit transmitted from the first wireless device, wherein a transmission of the resource request is determined by the first wireless device based on a quality of service (QoS) requirement of the data unit; and transmitting, to the first wireless device, one or more sidelink grants for the retransmission of the data unit.

According to an embodiment of the present disclosure, a base station (BS) in a wireless communication system comprises: a transceiver; a memory; and at least one processor operatively coupled to the transceiver and the memory, and configured to control the transceiver to: transmit, to a first wireless device, one or more sidelink grants used for the first wireless device to perform a transmission of a data unit to a second wireless device, receive, from the first wireless device via a physical uplink control channel (PUCCH), a resource request for a retransmission of the data unit transmitted from the first wireless device, wherein a transmission of the resource request is determined by the first wireless device based on a quality of service (QoS) requirement of the data unit, and transmit, to the first wireless device, one or more sidelink grants for the retransmission of the data unit.

3. Advantageous Effect

The present disclosure can have various advantageous effects.

For example, a UE performing a HARQ transmission of a packet by using radio resources can dynamically and efficiently allocate resources for retransmissions of the packet by considering service characteristics and requirements, in particular when packets from various services are multiplexed into a single data unit.

For example, a system can provide dynamic and efficient allocation of resources for data retransmissions for a UE performing HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
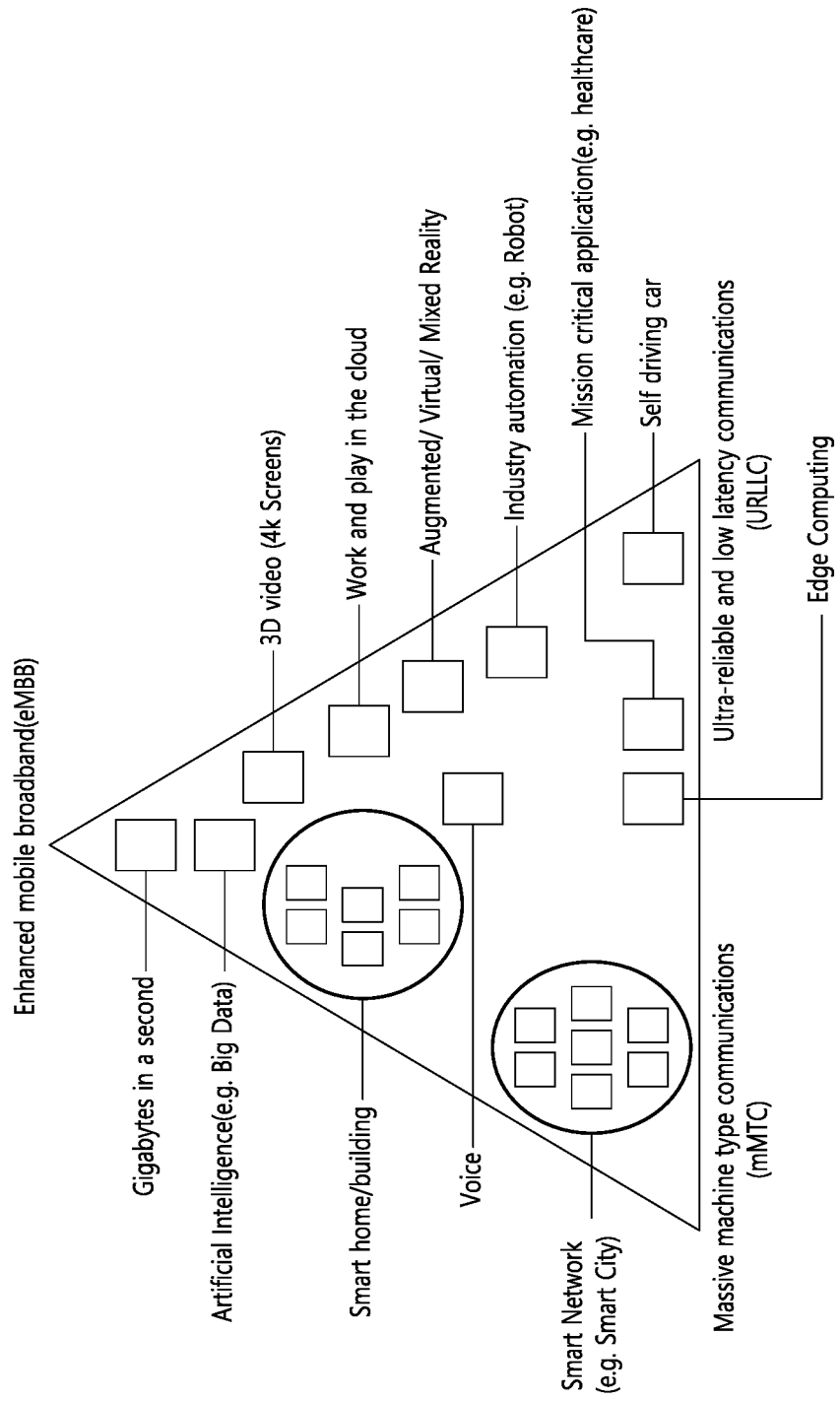
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Sidelink grant' refers to a resource allocated to be used for performing a sidelink transmission/reception via sidelink.

'Grant' refers to a resource allocated to be used for performing a transmission/reception.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
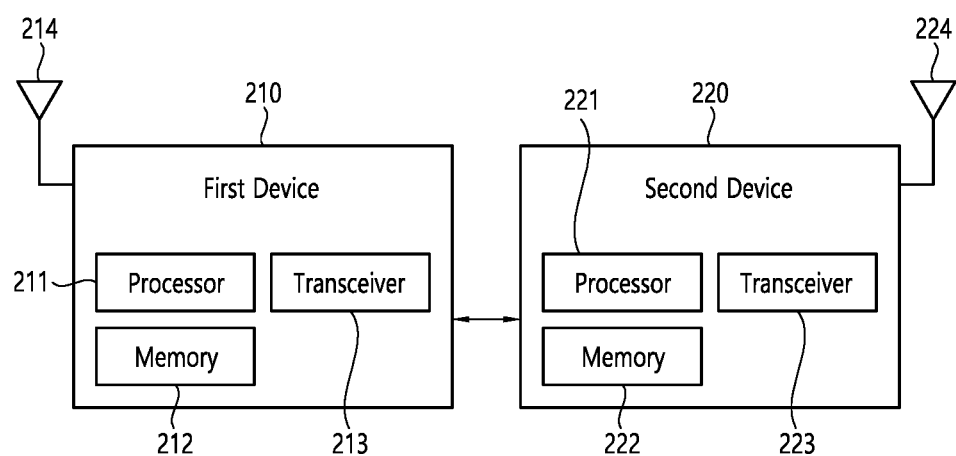
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
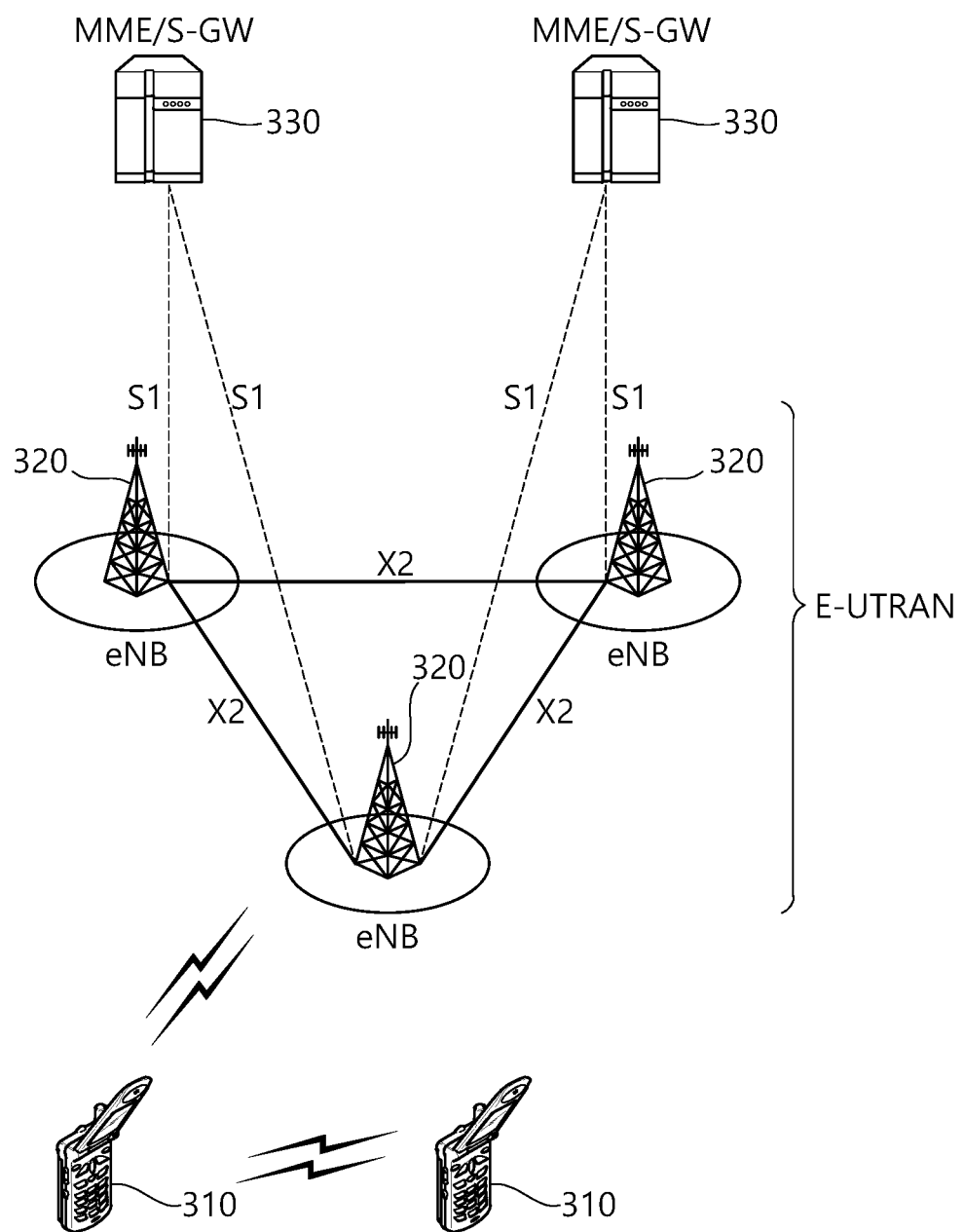
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
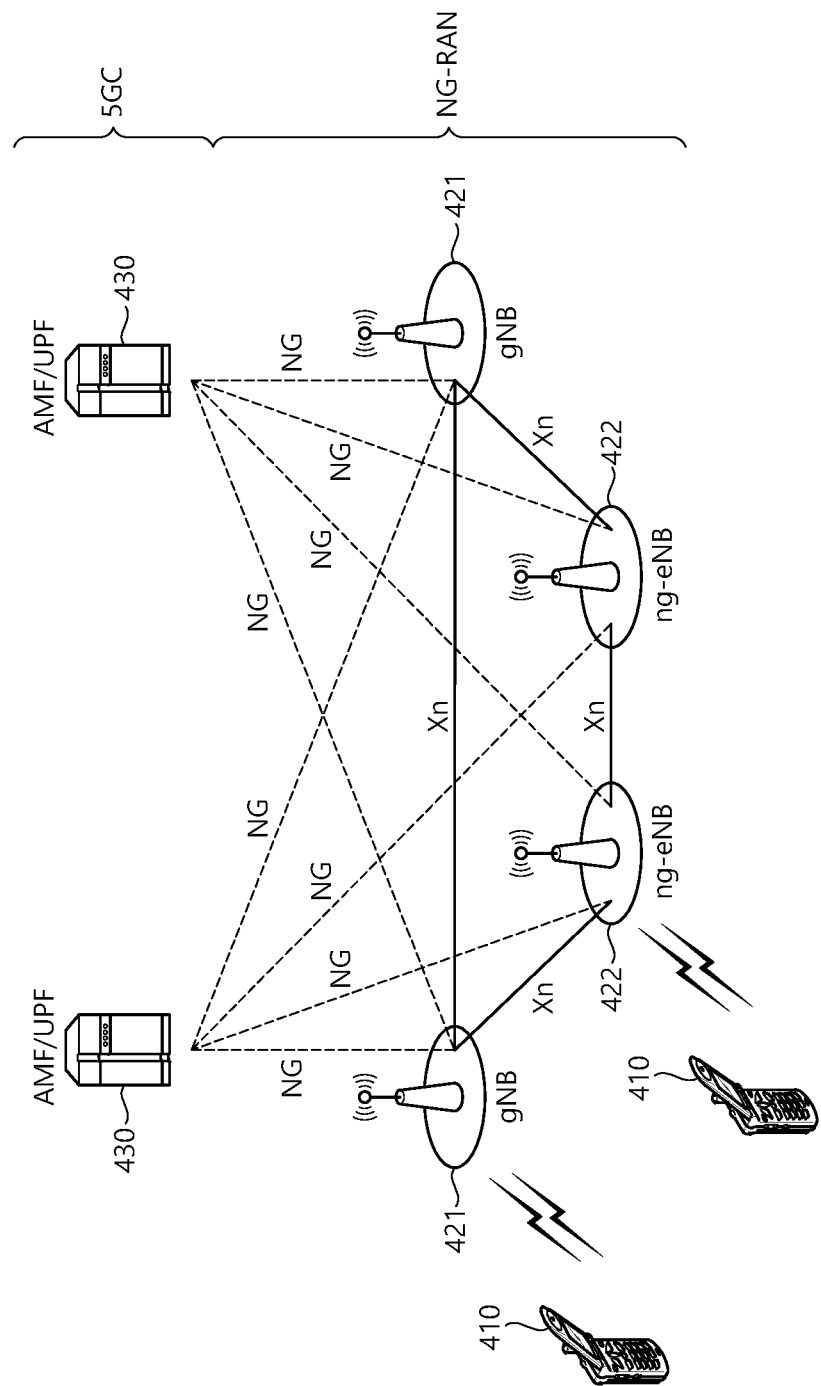
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
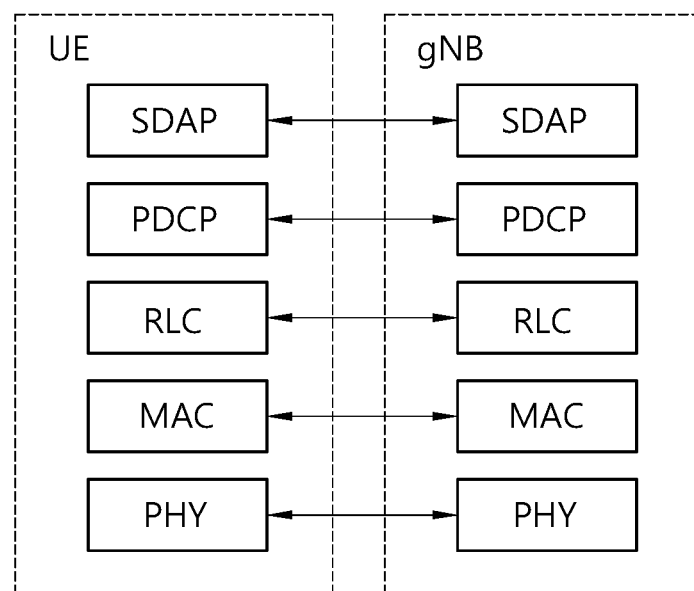
FIG. 5 shows a block diagram of a user plane protocol stack to which the technical features of the present disclosure can be applied.
Figure 6:
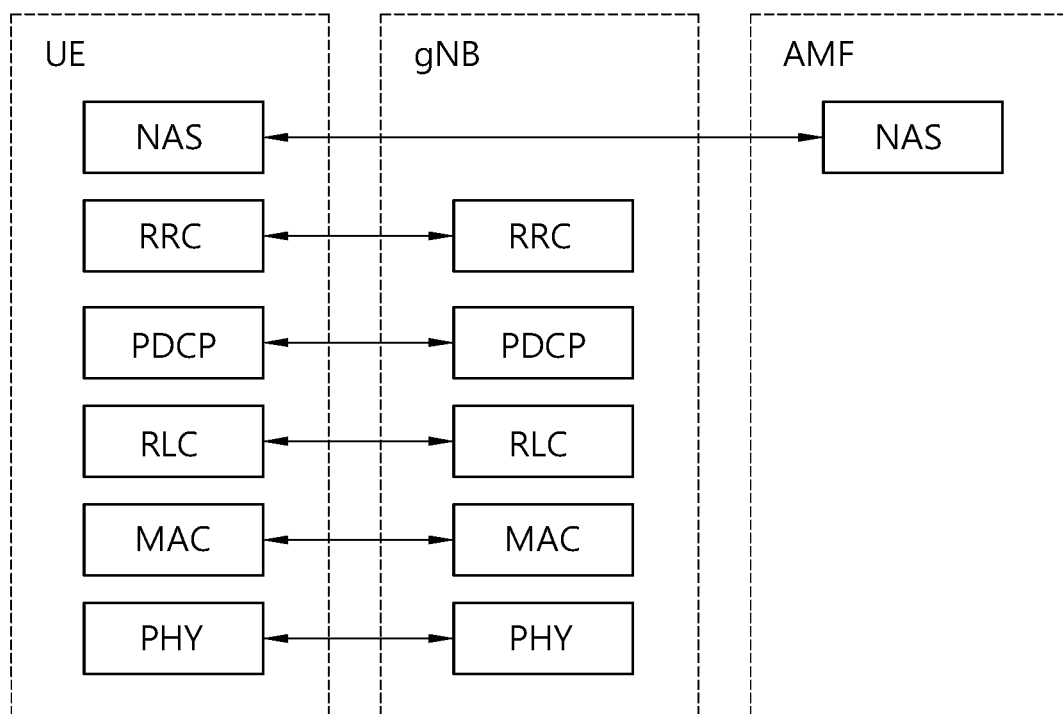
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
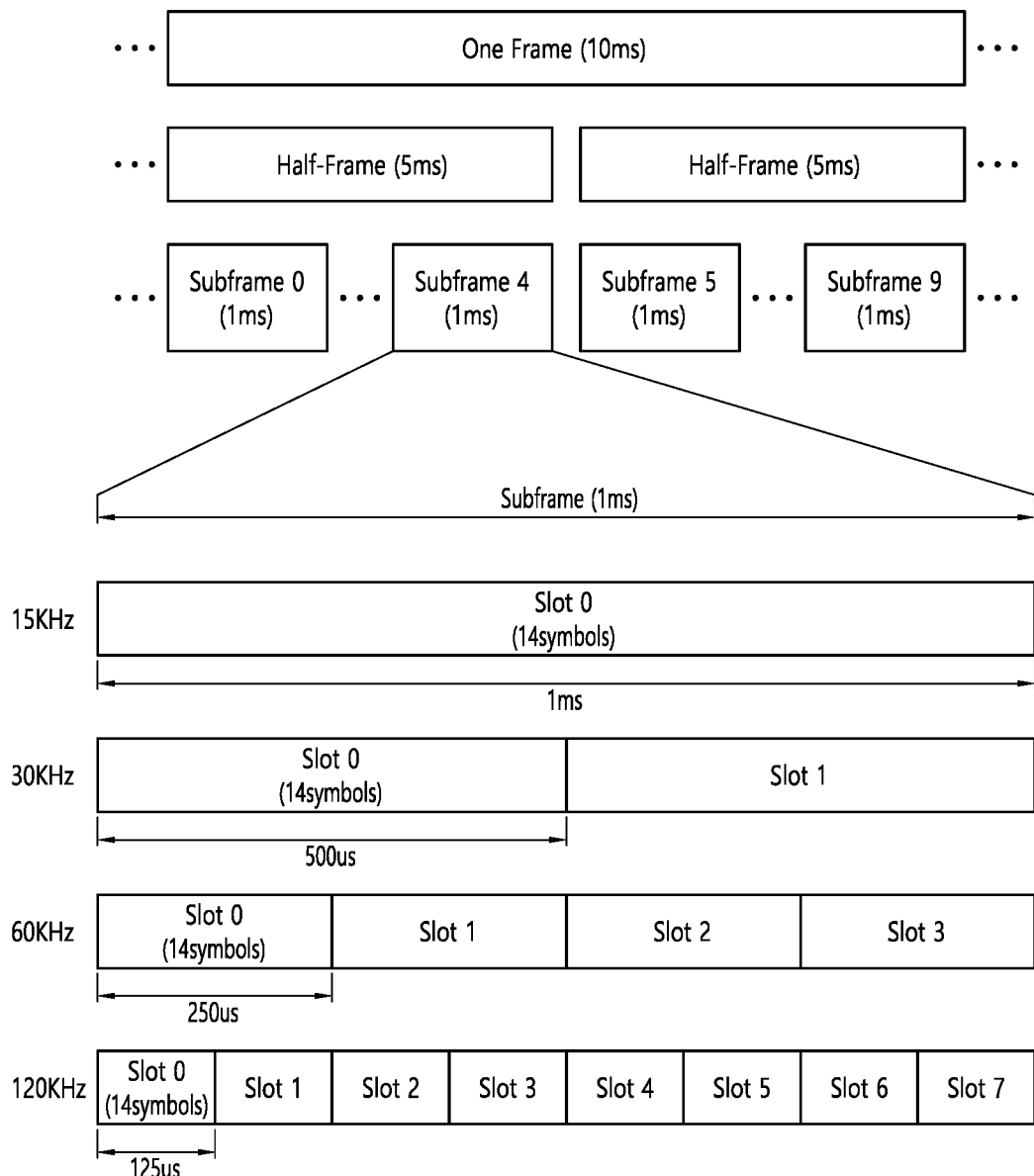
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing $\Delta f=2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid,x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs.

A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
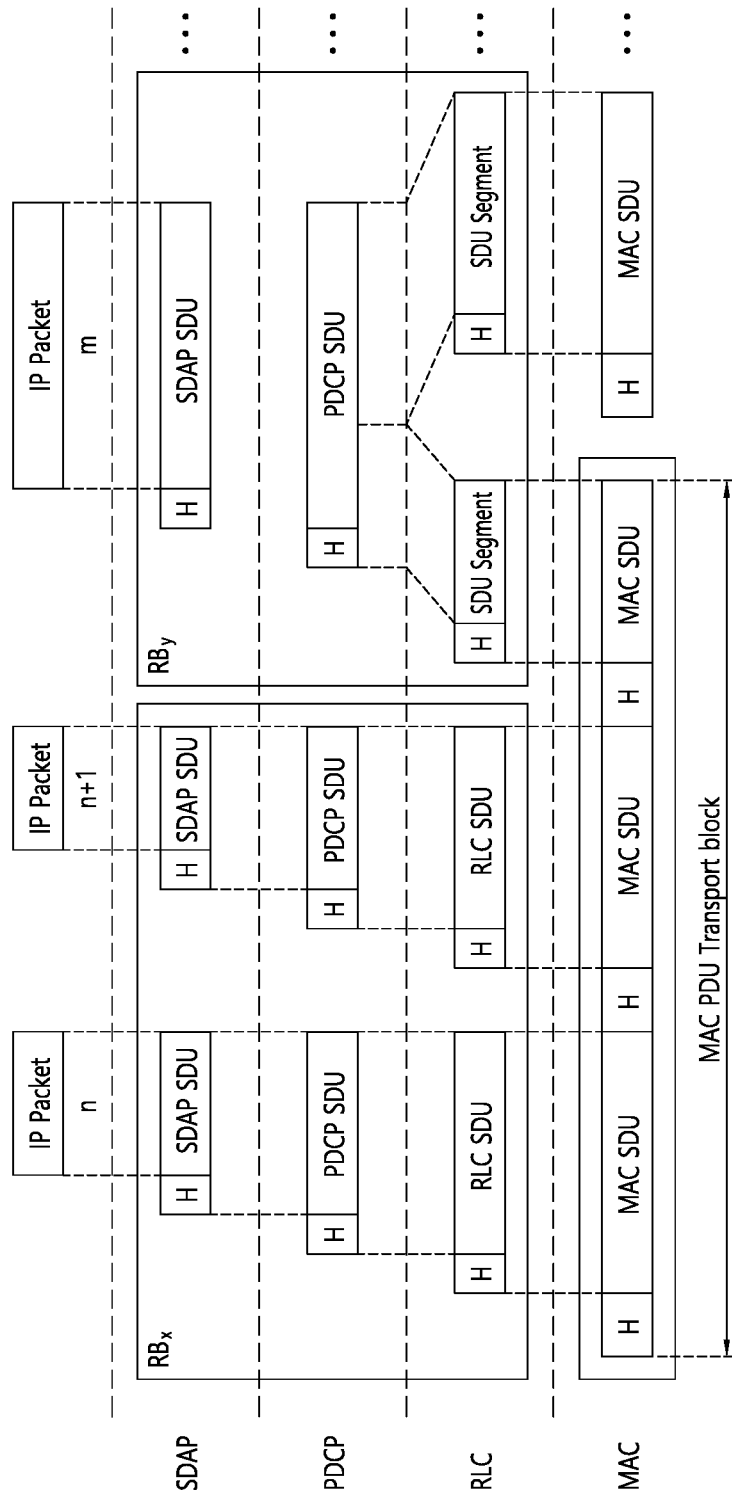
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
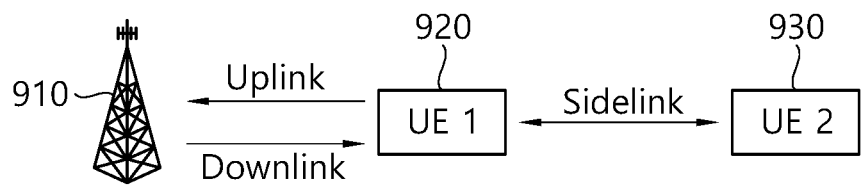
FIG. 9 shows an example of communication links to which technical features of the present disclosure can be applied.

FIG. 9 shows an example of communication links to which technical features of the present disclosure can be applied.

Referring to FIG. 9, the communication links comprise uplink, downlink, and sidelink. The uplink is a communication interface from a UE (e.g., UE 920) to a base station (e.g., base station 910, such as eNB and/or gNB). The downlink is a communication interface from a base station (e.g., base station 910) to a UE (e.g., UE 920).

The sidelink is UE to UE interface for sidelink communication, sidelink discovery and/or V2X (vehicle to everything) communication. For example, the sidelink may correspond to a PC5 interface for sidelink communication, sidelink discovery and/or V2X sidelink communication.

A UE may perform a communication via network infrastructure. For example, as shown in FIG. 9, the UE1 920 may perform an uplink transmission and/or receive a downlink transmission, via the base station 910.

Also, a UE may perform a communication directly with a peer UE without using the network infrastructure. For example, as shown in FIG. 9, the UE1 920 may perform a direct communication with the UE2 930 via sidelink, without a support of the network infrastructure such as base station 910.

In the direct communication via sidelink, a UE which performs a transmission to another UE via sidelink may be referred to as a transmission (TX) UE, and a UE which receives the transmission from another UE via sidelink may be referred to as a reception (RX) UE. For example, if the UE1 920 performs a transmission to the UE2 930 via sidelink, the UE1 920 may be TX UE, and the UE2 930 may be RX UE. For another example, if the UE2 930 performs a transmission to the UE1 920 via sidelink, the UE1 920 may be RX UE, and the UE2 930 may be TX UE.

According to various embodiments, upper layers configure the UE to receive or transmit sidelink communication on a specific frequency, to monitor or transmit non-public safety (PS) related sidelink discovery announcements on one or more frequencies or to monitor or transmit PS related sidelink discovery announcements on a specific frequency, but only if the UE is authorized to perform these particular proximity service (ProSe) related sidelink activities.

Sidelink communication comprises one-to-many and one-to-one sidelink communication. One-to-many sidelink communication comprises relay related and non-relay related one-to-many sidelink communication. One-to-one sidelink communication comprises relay related and non-relay related one-to-one sidelink communication. In relay related one-to-one sidelink communication the communicating parties comprise one sidelink relay UE and one sidelink remote UE.

Sidelink discovery comprises public safety related (PS related) and non-PS related sidelink discovery. PS related sidelink discovery comprises relay related and non-relay related PS related sidelink discovery. Upper layers indicate to RRC whether a particular sidelink announcement is PS related or non-PS related.

According to various embodiments, upper layers indicate to radio resource control (RRC) whether a particular sidelink procedure is V2X related or not.

According to various embodiments, the UE shall perform V2X sidelink communication operation if at least one of the following conditions 1)~3) is met:

Condition 1) if the UE's serving cell is suitable (RRC_IDLE or RRC_CONNECTED); and if either the selected cell on the frequency used for V2X sidelink communication operation belongs to the registered or equivalent public land mobile network (PLMN) as specified in 3GPP TS 24.334 or the UE is out of coverage on the frequency used for V2X sidelink communication operation as defined in 3GPP TS36.304;

Condition 2) if the UE's serving cell (for RRC_IDLE or RRC_CONNECTED) fulfils the conditions to support V2X sidelink communication in limited service state as specified in 3GPP TS 23.285; and if either the serving cell is on the frequency used for V2X sidelink communication operation or the UE is out of coverage on the frequency used for V2X sidelink communication operation as defined in 3GPP TS 36.304; or Condition 3) if the UE has no serving cell (RRC_IDLE).

Figure 10:
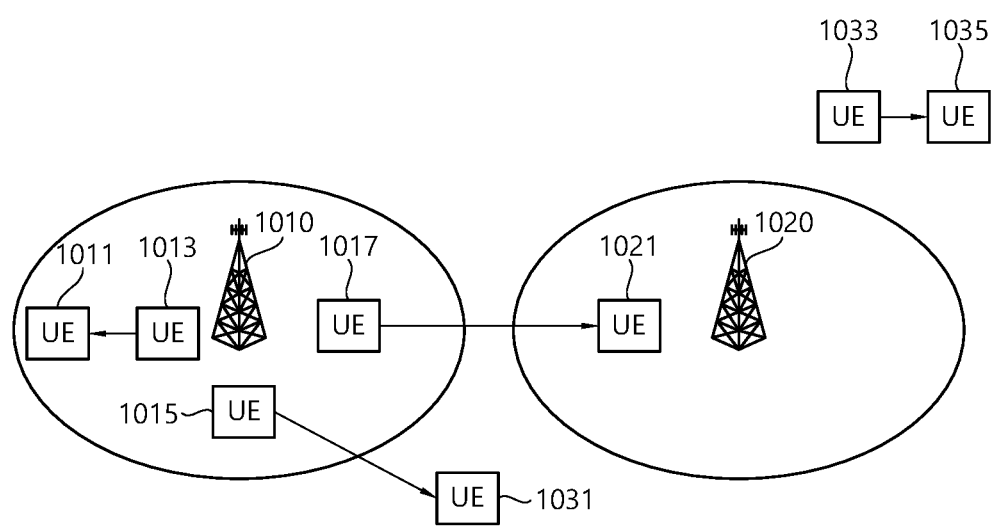
FIG. 10 shows an example of sidelink connectivity types to which technical features of the present disclosure can be applied.

FIG. 10 shows an example of sidelink connectivity types to which technical features of the present disclosure can be applied.

Referring to FIG. 10, a sidelink connectivity between UE 1011 and UE 1013 may be "in-coverage", where the two UEs UE 1011 and UE 1013 are under a coverage of a network (e.g., base station 1010). Also, the sidelink connectivity between the UE 1011 and the UE 1013 may be in-coverage of intra-cell type, as the UE 1011 receiving a sidelink transmission is within a same cell as the UE 1013 transmitting the sidelink transmission.

A sidelink connectivity between UE 1017 and UE 1021 may be also in-coverage, as the two UEs 1017 and 1021 are under a coverage of a network. However, unlike the case of the UE 1011 and the UE 1013, the sidelink connectivity between the UE 1017 and the UE 1021 may be in-coverage of inter-cell type, as the UE 1021 receiving a sidelink transmission is within a cell coverage of a base station 1020 while the UE 1017 transmitting the sidelink transmission is within a cell coverage of a base station 1010.

A sidelink connectivity between UE 1015 and UE 1031 may be "partial-coverage", where one of the two UEs (e.g., UE 1015) is under a coverage of a network while the other UE (e.g., UE 1031) is outside the coverage of the network.

A sidelink connectivity between UE 1033 and UE 1035 may be "out-of-coverage", where the two UEs UE 1033 and UE 1035 are outside a coverage of a network.

Figure 11:
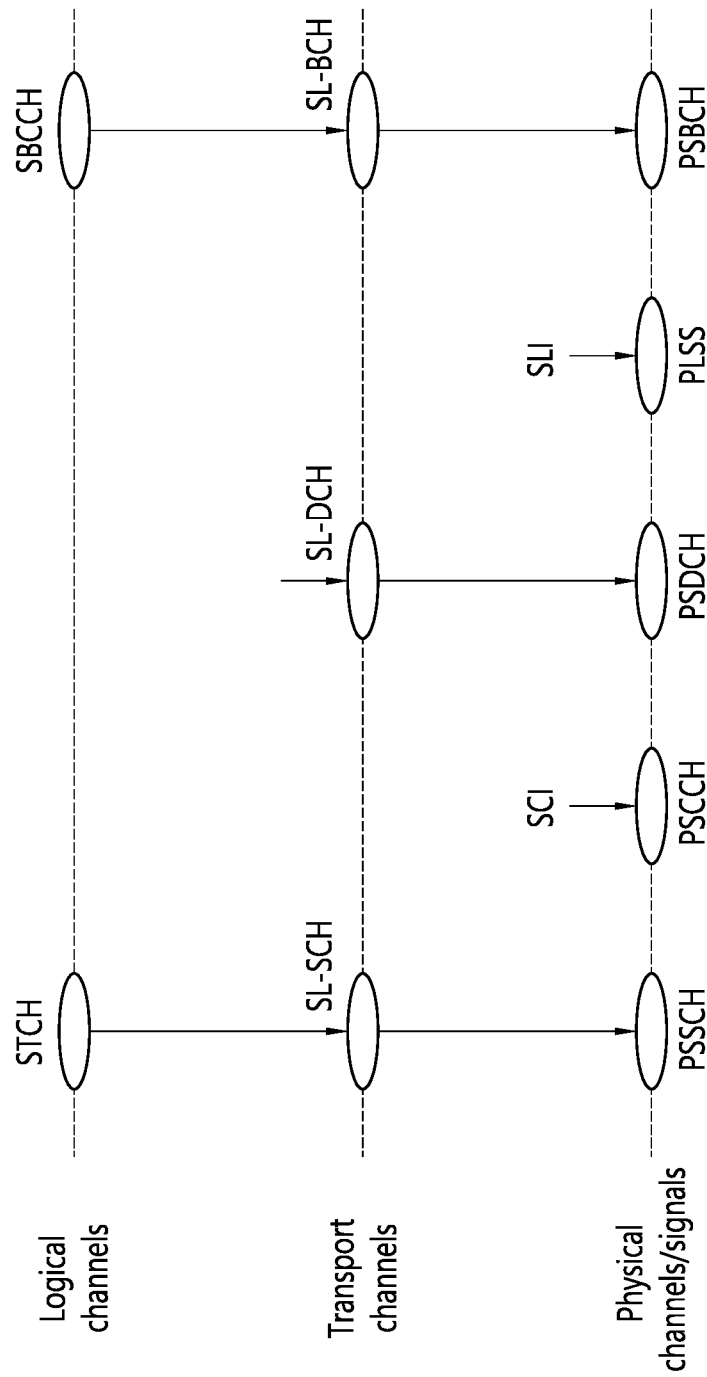
FIG. 11 shows an example of sidelink channel mapping to which technical features of the present disclosure can be applied.

FIG. 11 shows an example of sidelink channel mapping to which technical features of the present disclosure can be applied.

Referring to FIG. 11, sidelink logical channels may comprise sidelink traffic channel (STCH) and sidelink broadcast control channel (SBCCH). Sidelink transport channels may comprise sidelink shared channel (SL-SCH), sidelink discovery channel (SL-DCH), and sidelink broadcast channel (SL-BCH). Sidelink physical channels and/or signals may comprise physical sidelink shared channel (PSSCH), physical sidelink control channel (PSCCH), physical sidelink discovery channel (PSDCH), sidelink synchronization signal (SLSS), and physical sidelink broadcast channel (PSBCH).

The STCH carries user data for sidelink communication. The STCH is mapped to the SL-SCH which, in turn, is mapped to the PSSCH.

The PSCCH carries sidelink control information (SCI). The SCI contains sidelink scheduling information such as resource block assignment, modulation and coding scheme, and/or group destination ID.

The SL-DCH is used for discovery announcements. The SL-DCH is mapped to the PSDCH.

The SLSS is a physical signal, which is used to synchronize a sidelink communication between UE and peer UE. The SLSS is associated with a specific sidelink identity (SLI).

The SBCCH is mapped to the SL-BCH which, in turn, is mapped to the PSBCH. These channels are also used for sidelink synchronization, and comprise sidelink related system information. For example, the sidelink related system information may be referred to as sidelink master information block (SL-MIB).

Although not illustrated in FIG. 11, there might be other channel(s) such as sidelink feedback channel (SL-FCH) and/or physical sidelink feedback channel (PSFCH). These channels are used to carry sidelink feedback control information (SFCI) from a device receiving a sidelink transmission.

Hereinafter, sidelink HARQ operation is described.

The MAC entity may be configured by upper layers to transmit using pool(s) of resources on one or multiple carriers. For each carrier, there may be one sidelink HARQ entity at the MAC entity for transmission on SL-SCH, which maintains a number of parallel sidelink processes.

For sidelink communication, the number of transmitting sidelink processes associated with the sidelink HARQ entity may be 8 if the UE supports multiple transmissions of sidelink communication to different destinations in one sidelink control (SC) period.

For V2X sidelink communication, the maximum number of transmitting sidelink processes associated with each sidelink HARQ entity may be 8. A sidelink process may be configured for transmissions of multiple MAC PDUs. For transmissions of multiple MAC PDUs, the maximum number of transmitting sidelink processes associated with each sidelink HARQ entity may be 2.

A delivered and configured sidelink grant and HARQ information associated with the sidelink grant may be associated with a sidelink process.

For each subframe of the SL-SCH and each sidelink process, the sidelink HARQ Entity shall:
1> if a sidelink grant corresponding to a new transmission opportunity has been indicated for this sidelink process and there is SL data, for sidelink logical channels of proximity service (ProSe) destination associated with this sidelink grant, available for transmission:
2> obtain the MAC PDU from the "Multiplexing and assembly" entity;
2> deliver the MAC PDU and the sidelink grant and the HARQ information to this sidelink process;
2> instruct this Sidelink process to trigger a new transmission.
1> else, if this subframe corresponds to retransmission opportunity for this Sidelink process:
2> instruct this sidelink process to trigger a retransmission.

Hereinafter, sidelink process is described.

The Sidelink process may be associated with a HARQ buffer.

The sequence of redundancy versions may be 0, 2, 3, 1. The variable CURRENT_IRV may be an index into the sequence of redundancy versions. This variable may be updated modulo 4.

New transmissions and retransmissions either for a given SC period in sidelink communication or in V2X sidelink communication may be performed on the resource indicated in the sidelink grant and with the proper MCS.

If the sidelink process is configured to perform transmissions of multiple MAC PDUs for V2X sidelink communication, the sidelink process may maintain a counter SL_RESOURCE_RESELECTION_COUNTER. For other configurations of the sidelink process, this counter may not be available.

If the sidelink HARQ entity requests a new transmission, the sidelink process shall: set CURRENT_IRV to 0; store the MAC PDU in the associated HARQ buffer; store the sidelink grant received from the Sidelink HARQ Entity; and generate a transmission as described below.

If the sidelink HARQ entity requests a retransmission, the sidelink process shall: generate a transmission as described below.

To generate a transmission, the sidelink process shall:
1> if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and
1> if there is no sidelink discovery gap for transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:
2> instruct the physical layer to generate a transmission according to the stored sidelink grant with the redundancy version corresponding to the CURRENT_IRV value.
1> increment CURRENT_IRV by 1;
1> if this transmission corresponds to the last transmission of the MAC PDU:
2> decrement SL_RESOURCE_RESELECTION_COUNTER by 1, if available.

The transmission of the MAC PDU for V2X sidelink communication may be prioritized over uplink transmissions if the following conditions 1~3 are met:
Condition 1) if the MAC entity is not able to perform all uplink transmissions and all transmissions of V2X sidelink communication simultaneously at the time of the transmission; and
Condition 2) if uplink transmission is not prioritized by upper layer; and
Condition 3) if the value of the highest priority of the sidelink logical channel(s) in the MAC PDU is lower than thresSL-TxPrioritization if thresSL-TxPrioritization is configured.

For sidelink transmission, TX UE may transmit HARQ (re-)transmissions of a MAC PDU. Then, RX UE can send positive or negative HARQ feedback to TX UE. When TX UE receives, from RX UE, a negative feedback (i.e., NACK) for a (re-)transmission of a MAC PDU, TX UE can perform a retransmission of the MAC PDU. However, in some cases, TX UE may not have resource(s) for retransmission of the MAC PDU.

In particular, when TX UE has no retransmission resource for sidelink retransmission, TX UE can request sidelink resource(s) to a base station (e.g. gNB/NG-RAN). Then, when TX UE receives a sidelink grant for the retransmission, TX UE will perform retransmission of the MAC PDU based on the received sidelink grant for the retransmission. However, it may take some time in steps of requesting the resources and receiving the sidelink grant for the retransmission. Thus, if a packet included in the MAC PDU has delay requirement and the steps cannot meet the delay requirement, requesting the resources would be unnecessary because the retransmission of the MAC PDU may be performed after the delay requirement of the packet lapses.

Therefore, various embodiments of the present disclosure provide a method and apparatus for requesting resources for a sidelink retransmission based on quality of service (QoS) requirements.

Figure 12:
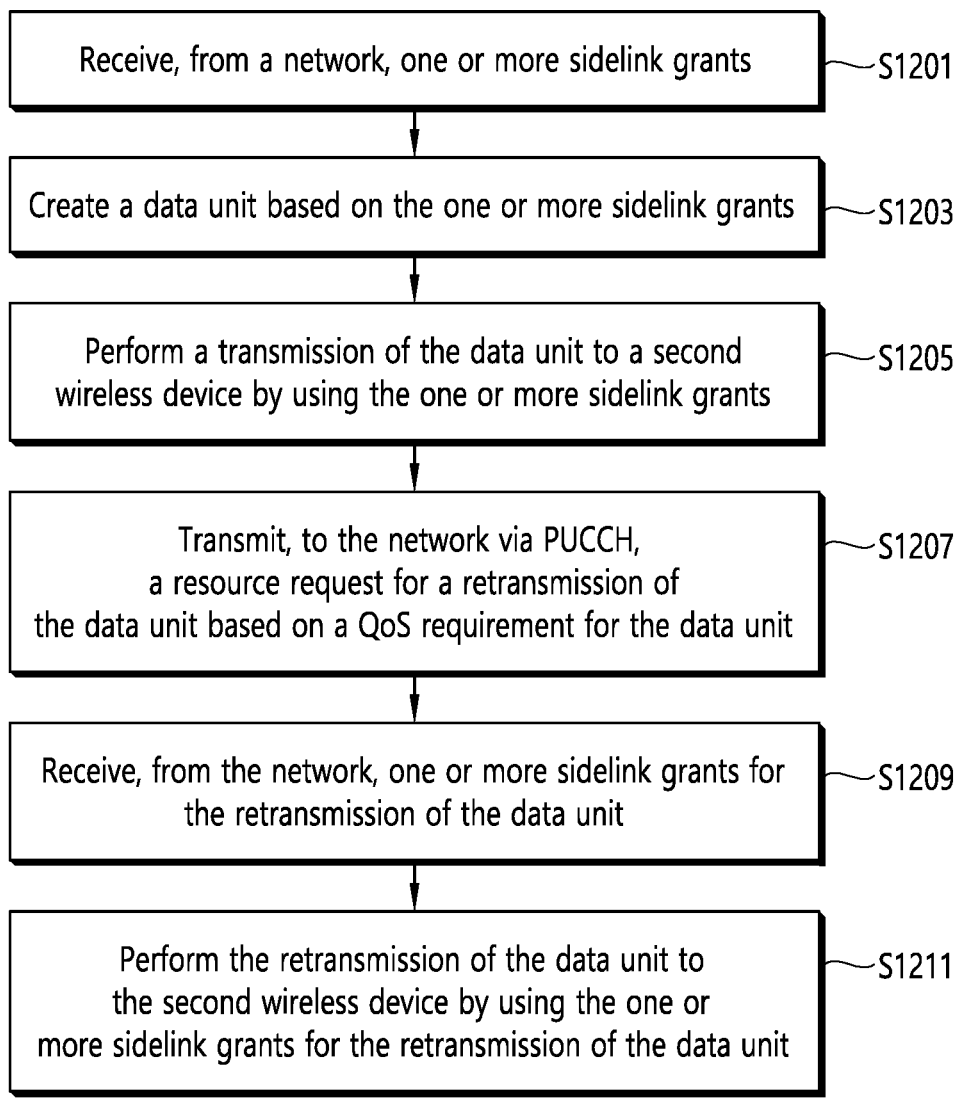
FIG. 12 shows an example of a method for requesting sidelink retransmission resources according to an embodiment of the present disclosure.

FIG. 12 shows an example of a method for requesting sidelink retransmission resources according to an embodiment of the present disclosure. Steps illustrated in FIG. 12 may be performed by at least one of a UE and/or a first wireless device.

Referring to FIG. 12, in step S1201, the first wireless device may receive, from a network, one or more sidelink grants.

In step S1203, the first wireless device may create a data unit based on the one or more sidelink grants. The data unit may comprise a MAC PDU.

In step S1205, the first wireless device may perform a transmission of the data unit to a second wireless device by using the one or more sidelink grants.

In step S1207, the wireless device may transmit, to the network via PUCCH, a resource request for a retransmission of the data unit based on a QoS requirement for the data unit. The QoS requirement for the data unit may comprise at least one of a required delay of the data unit, a required communication range, or a required error rate.

In step S1209, the wireless device may receive, from the network, one or more sidelink grants for the retransmission of the data unit.

In step S1211, the wireless device may perform the retransmission of the data unit to the second wireless device by using the one or more sidelink grants for the retransmission of the data unit.

According to various embodiments, the first wireless device may determine whether the QoS requirement of the data unit is satisfied. The first wireless device may transmit, to the network via the PUCCH, the resource request for the retransmission of the data unit based on a determination that the QoS requirement of the data unit is satisfied.

According to various embodiments, tie first wireless device may determine not to transmit the resource request for the transmission of the data unit based on a determination that the QoS requirement of the data unit is not satisfied.

According to various embodiments, the QoS requirement is satisfied based on that a negative acknowledgement (NACK) for a most recent transmission of the data unit is received within {the required delay-a threshold} from a time of an initial transmission of the data unit. The most recent transmission may comprise $n^{th}$ transmission, where the $n^{th}$ transmission is the initial transmission if n=1, and is retransmission if n≥1. Herein, n is a positive integer. The threshold may be configured or signalled by a network to the wireless device via at least one of downlink control information (DCI), a media access control (MAC) control element (MAC CE), or a radio resource control (RRC) signalling. Or, the threshold may be preconfigured.

According to various embodiments, the QoS requirement may be satisfied based on that a PUCCH resource for transmission a scheduling request is available within {the required delay-a threshold} from a time of an initial transmission of the data unit. The threshold may be configured or signalled by a network to the wireless device via at least one of downlink control information (DCI), a media access control (MAC) control element (MAC CE), or a radio resource control (RRC) signalling. Or, the threshold may be preconfigured.

According to various embodiments, the QoS requirement may be satisfied based on that a distance between the first wireless device and the second wireless device is shorter than or equal to the required communication range.

According to various embodiments, the first wireless device may transmit, to the network via the PUCCH, the resource request for the retransmission of the data unit based on at least one of a congestion level or a priority of the data unit. The congestion level may comprise a CBR.

According to various embodiments, the first wireless device may measure a channel busy ratio (CBR) on sidelink resources. The first wireless device may transmit, to the network via the PUCCH, the resource request for the retransmission of the data unit, based on a determination that the CBR is below or equal to a threshold related to the priority of the data unit.

According to various embodiments, the transmission of the data unit may comprise one or more transmissions of the data unit related to a hybrid automatic repeat request (HARQ) process. The resource request may comprise at least one of a HARQ process identity (ID) of the HARQ process, a requested size of a resource for the retransmission of the data unit, or a requested number of retransmissions of the data unit.

According to various embodiments, the first wireless device may receive, from the second wireless device, an acknowledgement (ACK) for the retransmission of the data unit. The first wireless device may perform a transmission of another data unit to the second wireless device by using remaining grants among the one or more sidelink grants for the retransmission of the data unit after the retransmission is performed.

The first wireless device may receive, from the second wireless device, an acknowledgement (ACK) for the retransmission of the data unit. The first wireless device may release remaining grants among the one or more sidelink grants for the retransmission of the data unit after the retransmission is performed.

Figure 13:
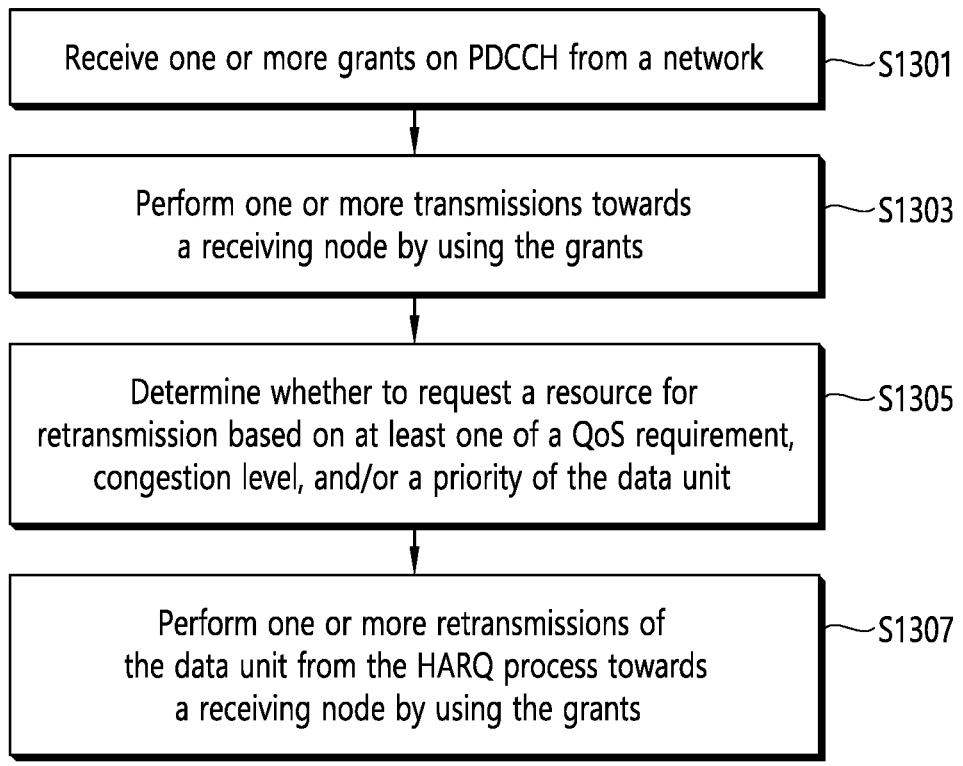
FIG. 13 shows an example of a method for performing a data transmission according to an embodiment of the present disclosure.

FIG. 13 shows an example of a method for performing a data transmission according to an embodiment of the present disclosure. Steps illustrated in FIG. 13 may be performed by a UE and/or a wireless device.

Referring to FIG. 13, in step S1301, the UE may receive one or more grants on PDCCH from a network. For example, when data is available for a transmission in a UE buffer, the UE may request one or more resources to the network and receive one or more grants on PDCCH from the network. Alternatively, the UE may reserve one or more resources which may be considered as grants.

In step 1303, the UE may perform one or more transmissions towards a receiving node by using the grants. The UE may create a data unit based on the grant(s) and perform one or more transmissions of the data unit from a HARQ process towards a receiving node by using the grant(s). The receiving node may comprise at least one of another UE or a base station such as gNB or eNB. If the receiving node is another UE, the transmission may be performed in sidelink. If the receiving node is the base station, the transmission may be performed in uplink. The data unit may comprise a MAC PDU.

In step 1305, the UE may determine whether to request a resource for retransmission based on at least one of a QoS requirement, congestion level, and/or a priority of the data unit. More specifically, if no positive acknowledgement (i.e., ACK) for the transmission of the data unit has been received yet and if there is no grant for a retransmission for the HARQ process, the UE may determine whether a retransmission of the data unit is still valid or not and/or whether PUCCH resources can be used for requesting the retransmission resource based on at least one of the QoS requirement, congestion level and/or the priority of the data unit.

According to various embodiments, the QoS requirement may include at least one of a delay requirement, error rate, and/or a communication range.

According to various embodiments, the congestion level may include a channel busy ratio (CBR).

When the UE determines that a retransmission of the data unit is still valid and/or there is a PUCCH resource which can be used for requesting a retransmission resource, the UE may request a resource for the retransmission to the network. The request may be indicated via uplink control information (UCI) over PUCCH.

In step 1307, the UE may perform one or more retransmissions of the data unit from the HARQ process towards a receiving node by using the grants. Upon receiving one or more grants on PDCCH from the network, the UE may perform one or more retransmissions of the data unit from the HARQ process towards a receiving node by using the grant(s). The grants may be received with a HARQ process ID of the HARQ process.

Figure 14:
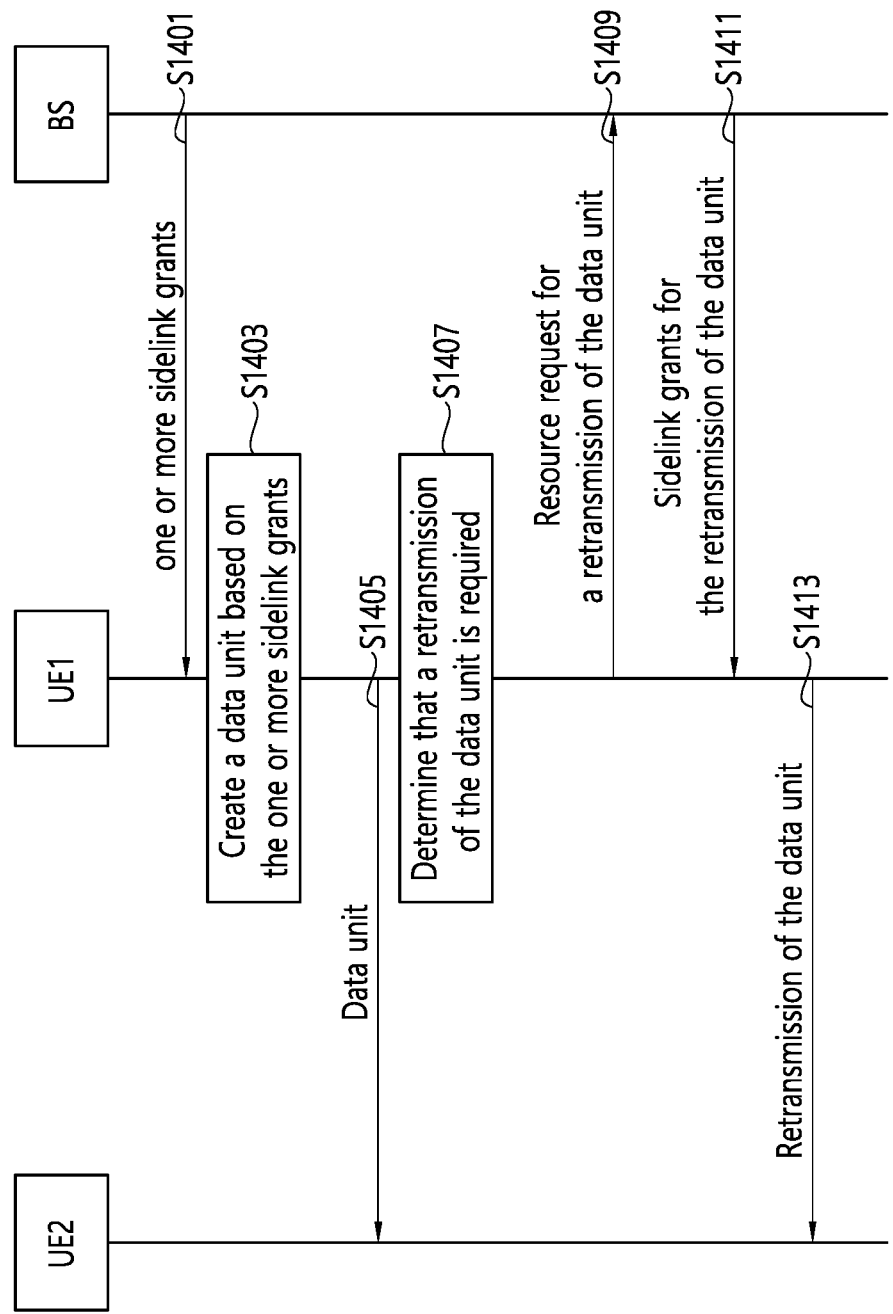
FIG. 14 shows an example of a signal flow for requesting sidelink retransmission resources according to an embodiment of the present disclosure.

FIG. 14 shows an example of a signal flow for requesting sidelink retransmission resources according to an embodiment of the present disclosure. In the signal flow, UE1, UE2 and base station (BS) are involved.

Referring to FIG. 14, in step S1401, the BS may transmit, to the UE1, one or more sidelink grants.

In step S1403, the UE1 may create a data unit based on the one or more sidelink grants. The data unit may comprise a MAC PDU.

In step S1405, the UE1 may perform a transmission of the data unit to the UE2 by using the one or more sidelink grants.

In step S1407, the UE1 may determine that a retransmission of the data unit is required. For example, the UE1 may determine that a retransmission of the data unit is required if the UE1 has received a NACK for the data unit from the UE2.

In step S1409, the BS may receive, from the UE1 via PUCCH, a resource request for a retransmission of the data unit. The UE1 may transmit the resource request for the retransmission of the data unit based on a QoS requirement for the data unit. The QoS requirement for the data unit may comprise at least one of a required delay of the data unit, a required communication range, or a required error rate.

In step S1411, the BS may transmit, to the UE1, one or more sidelink grants for the retransmission of the data unit.

In step S1413, the UE1 may perform the retransmission of the data unit to the UE2 by using the one or more sidelink grants for the retransmission of the data unit.

The BS in FIG. 14 may be an example of a second device 220 in FIG. 2, and therefore, steps of the BS as illustrated in FIG. 14 may be implemented by the second device 220. For example, the processor 221 may be configured to control the transceiver to transmit, to the UE1, one or more sidelink grants used for the UE1 to perform a transmission of a data unit to the UE2. The processor 221 may be configured to control the transceiver to receive, from the UE1 via a PUCCH, a resource request for a retransmission of the data unit transmitted from the UE1. The transmission of the resource request may be determined by the UE1 based on a QoS requirement of the data unit. The processor 221 may be configured to control the transceiver to transmit, to the UE1, one or more sidelink grants for the retransmission of the data unit.

Figure 15:
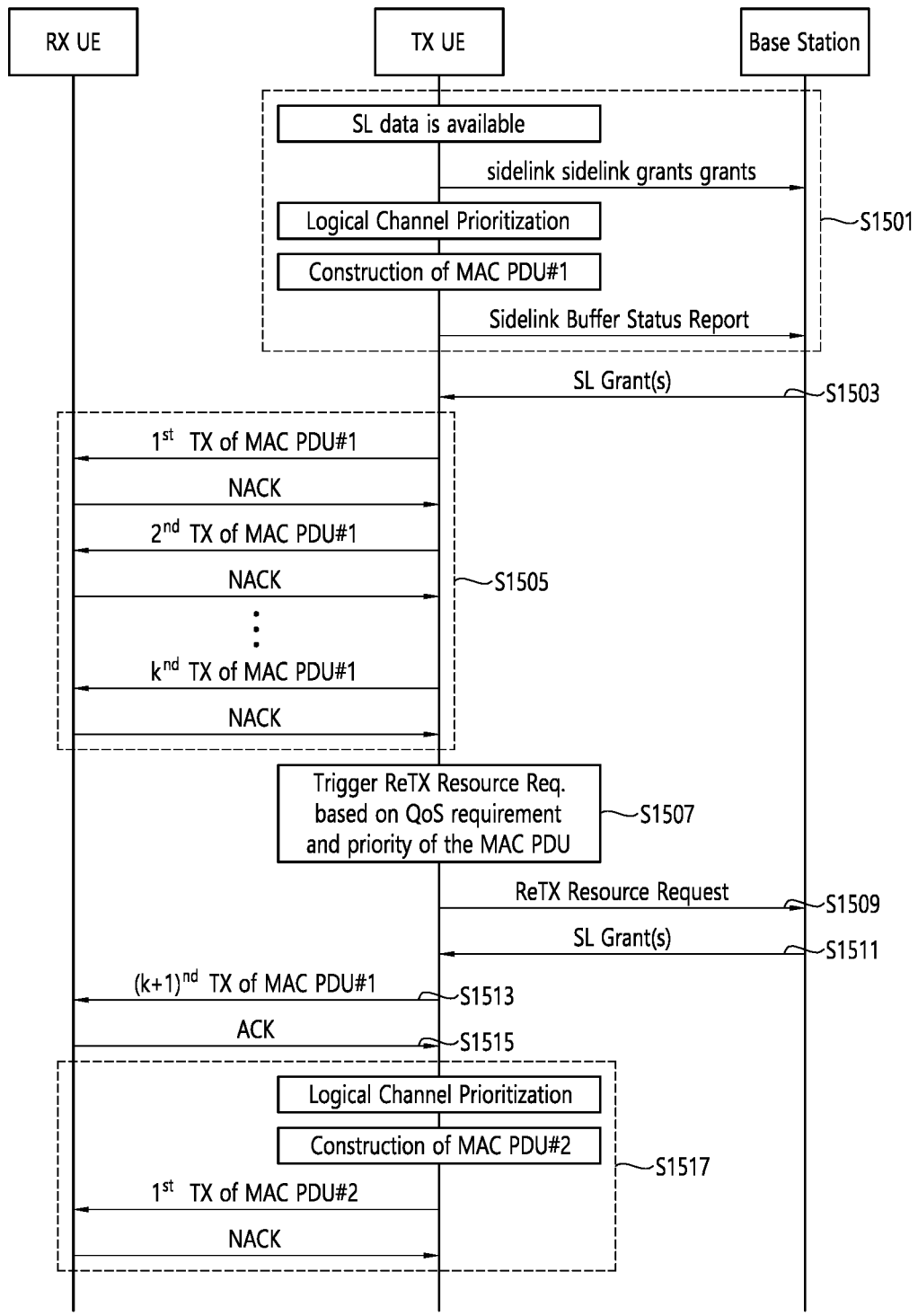
FIG. 15 shows an example of sidelink transmission of a MAC PDU according to an embodiment of the present disclosure.

FIG. 15 shows an example of sidelink transmission of a MAC PDU according to an embodiment of the present disclosure.

Referring to FIG. 15, in step S1501, when data is available for transmission in a UE buffer, the TX UE may request one or more resources to a network. For example, the TX UE may transmit a scheduling request (SR) to the network, and receive a resource allocated to be used for transmitting a sidelink buffer status report (BSR). The TX UE may request one or more resources to the network by transmitting the sidelink BSR using the allocated resource.

In step S1503, the TX UE may receive one or more grants on PDCCH from the network. The one or more grants may comprise sidelink grants.

Alternatively, the TX UE may reserve one or more resources which can be considered as the grants. In this case, the TX UE may not need to transmit the SR and/or the sidelink BSR to the network.

After receiving or reserving the one or more grants, the TX UE may create a data unit based on the grants. The data unit may comprise a MAC PDU.

In step S1505, the TX UE may perform one or more transmissions from a HARQ process towards a receiving node by using the grants. The receiving node may be either another UE (e.g., RX UE). The transmission may be performed in sidelink. The TX UE may monitor PSSCH/physical sidelink feedback channel (PSFCH) providing an acknowledgement to the HARQ (re-)transmission. Upon receiving a negative acknowledgement (NACK), no acknowledgment, or a grant for retransmission of the data unit, the TX UE may perform a retransmission of the data unit.

In step S1507, the TX UE may trigger retransmission resource request based on a QOS requirement, congestion level and/or a priority of the data unit. In specific, if no positive acknowledgement to the transmission of the data unit has been received yet and if there is no grant for retransmission for the HARQ process, the TX UE may determine whether a retransmission of the data unit is still valid or not and/or whether PUCCH resources can be used for requesting retransmission resource based on at least one of the QoS requirement, congestion level and/or the priority of the data unit.

The QoS requirement may include at least one of a requirement on delay, error rate, and/or communication range.

The congestion level may include a CBR.

For example, if the required delay of the data unit is 100 ms, and if the acknowledgement information (i.e., NACK) for the most recent (re-)transmission of the data unit is received within {100 ms–a threshold} from the start of the first/initial transmission of the data unit, the TX UE may request the retransmission resource(s) to the network. On the other hand, if the acknowledgement information (i.e., NACK) for the most recent (re-)transmission of the data unit is received after {100 ms–a threshold} from the start of the first/initial transmission of the data unit, the TX UE may not request the retransmission resource(s) to the network. The threshold may be configured by the network or pre-configured.

For example, if the required delay of the data unit is 100 ms, and if there is a valid PUCCH resource for scheduling request within {100 ms–a threshold} from the start of the first/initial transmission of the data unit, TX UE may request the retransmission resource(s) to the network. But, if there is no valid PUCCH resource for scheduling request within {100 ms–a threshold} from the start of the first/initial transmission of the data unit, the TX UE may not request the retransmission resource(s) to the network. The threshold may be configured by the network or pre-configured.

For example, if the required communication range is 200 m, and if the distance between the TX UE and the receiving node (e.g., RX UE) is shorter than or equal to 200 ms, the TX UE may request the retransmission resource(s) to the network. On the other hand, if the distance between the TX UE and the receiving node (e.g., RX UE) is longer than 200 ms, the TX UE may not request the retransmission resource(s) to the network.

For example, the TX UE may measure the channel busy ratio (CBR) on sidelink resources. If the CBR is below or equal to a threshold related to the priority of the data unit, the TX UE may request the resource(s) to the network. On the other hand, if the CBR is above a threshold related to the priority of the data unit, the TX UE may not request the resource(s) to the network.

In step S1509, when the TX UE determined that a retransmission of the data unit is still valid and/or when there are PUCCH resources which can be used for requesting a retransmission resource, the TX UE may request a retransmission resource to the network. The retransmission resource request may be indicated via UCI over PUCCH. The retransmission resource request may explicitly or implicitly indicate the HARQ process ID of the HARQ process to the network.

The retransmission resource request may explicitly or implicitly indicate a requested resource size to the network.

The retransmission resource request may explicitly or implicitly indicate the requested number of retransmissions of the data unit to the network.

On the other hand, when the TX UE determined that a retransmission of the data unit is not valid and/or when there are no PUCCH resources which can be used for requesting retransmission resource, the TX UE may not request a retransmission resource to the network.

In step S1511, the TX UE may receive one or more grants on PDCCH from the network. The grants may comprise sidelink grants, and may be received with a HARQ process ID of the HARQ process.

In step S1513, upon receiving one or more grants on PDCCH from the network, when the TX UE determined that a retransmission of the data unit is still valid, the TX UE may perform one or more retransmissions of the data unit from the HARQ process towards a receiving node (e.g., RX UE) by using the grant(s).

Alternatively, upon receiving one or more grants on PDCCH from the network, when the TX UE determined that a retransmission of the data unit is not valid, the TX UE may perform one or more transmissions of a new data unit from the HARQ process towards a receiving node (e.g., RX UE) by using the grant(s).

In step S1515, the TX UE may receive a positive acknowledgement (i.e., ACK) for the retransmission.

In step S1517, if the positive acknowledgment (i.e., ACK) for the retransmission is received, the TX UE may (re-)allocate the remaining grant(s) received on the PDCCH to another data unit for the same or a different HARQ process. Alternatively, if the positive acknowledgment (i.e., ACK) for the retransmission is received, the TX UE may skip/release the remaining grant(s) received on the PDCCH.

Various embodiments of the present disclosure may be applied to HARQ transmission and retransmissions of a MAC PDU not only in sidelink but also in uplink. For uplink case, the RX UE in FIG. 15 may be replaced with a base station.

According to various embodiments, for PSFCH reception, the MAC entity shall:
1> for a PSFCH duration during which the MAC entity monitors PSFCH:
2> if an acknowledgement corresponding to the transmission is obtained from the physical layer:
3> deliver the acknowledgement to the corresponding Sidelink HARQ entity;
2> if the MAC entity has been configured with a PUCCH resource which is valid for requesting a retransmission of the MAC PDU for the Sidelink process:
3> instruct the physical layer to signal [the acknowledgement] on the PUCCH for requesting retransmission resources.

According to various embodiments, to decide request transmission resource and sidelink resource allocation, the UE shall:
1> if sl-HARQ-FeedbackEnabled has been set to disabled for the logical channel(s) in the MAC PDU and no sidelink grant is available for next retransmission(s) of the MAC PDU, if any:
2> instruct the physical layer to signal a negative acknowledgement corresponding to the transmission on the PUCCH.
1> else if sl-HARQ-FeedbackEnabled has been set to disabled for the logical channel(s) in the MAC PDU and next retransmission(s) of the MAC PDU is not required:
2> instruct the physical layer to signal a positive acknowledgement corresponding to the transmission on the PUCCH.

Figure 16:
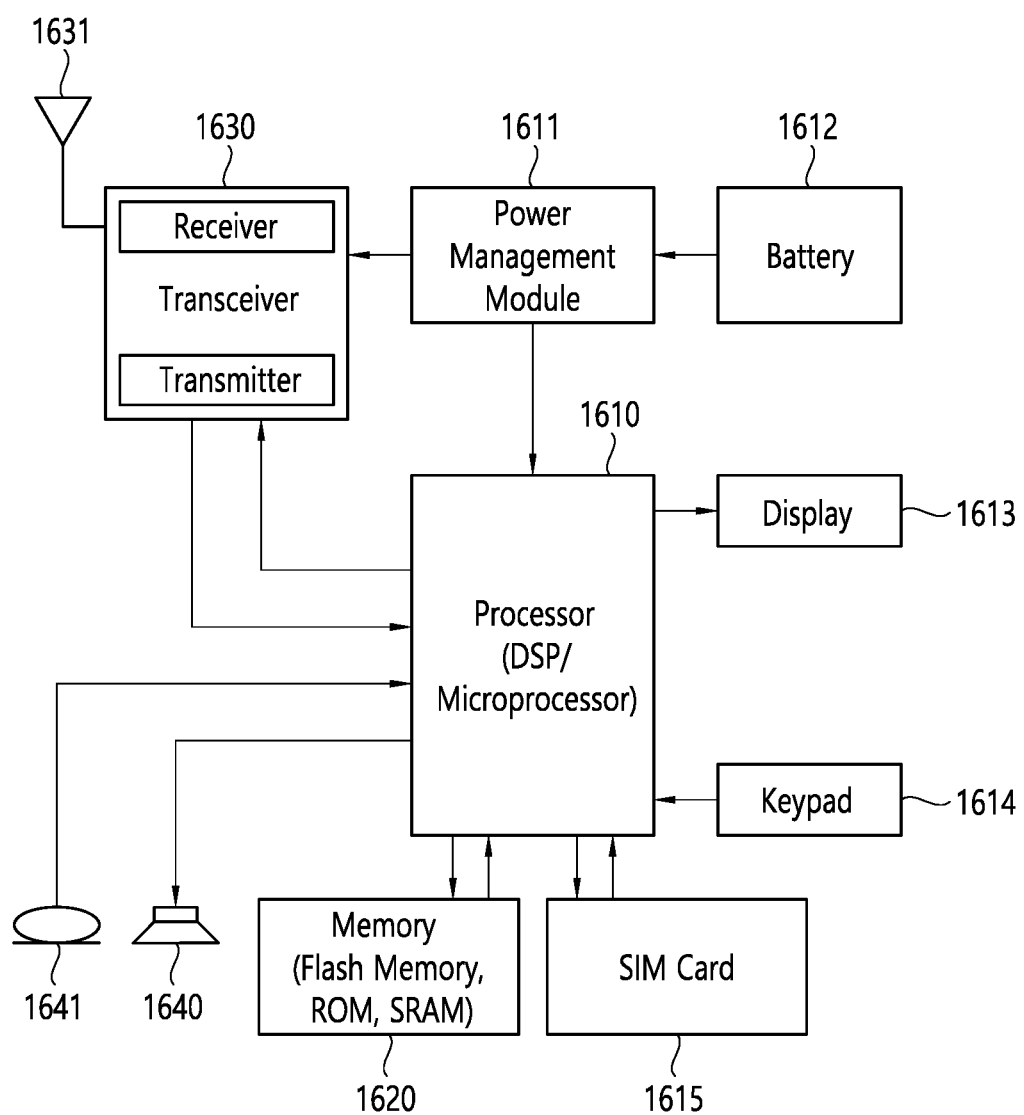
FIG. 16 shows a UE to implement an embodiment of the present disclosure. The present disclosure described above for UE side may be applied to this embodiment.

FIG. 16 shows a UE to implement an embodiment of the present disclosure. The present disclosure described above for UE side may be applied to this embodiment. The UE in FIG. 16 may be an example of first device 216 as illustrated in FIG. 2.

A UE includes a processor 1610 (i.e., processor 211), a power management module 1611, a battery 1612, a display 1613, a keypad 1614, a subscriber identification module (SIM) card 1615, a memory 1620 (i.e., memory 212), a transceiver 1630 (i.e., transceiver 213), one or more antennas 1631, a speaker 1640, and a microphone 1641.

The processor 1610 may be configured to implement proposed functions, procedures and/or methods described in this description. Layers of the radio interface protocol may be implemented in the processor 1610. The processor 1610 may include application-specific integrated circuit (ASIC), other chipset, logic circuit and/or data processing device. The processor 1610 may be an application processor (AP). The processor 1610 may include at least one of a digital signal processor (DSP), a central processing unit (CPU), a graphics processing unit (GPU), a modem (modulator and demodulator). An example of the processor 1610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1610 may be configured to, or configured to control the transceiver 1630 to implement steps performed by the UE and/or the wireless device throughout the disclosure.

The power management module 1611 manages power for the processor 1610 and/or the transceiver 1630. The battery 1612 supplies power to the power management module 1611. The display 1613 outputs results processed by the processor 1610. The keypad 1614 receives inputs to be used by the processor 1610. The keypad 1614 may be shown on the display 1613. The SIM card 1615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1620 is operatively coupled with the processor 1610 and stores a variety of information to operate the processor 1610. The memory 1620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1620 and executed by the processor 1610. The memory 1620 can be implemented within the processor 1610 or external to the processor 1610 in which case those can be communicatively coupled to the processor 1610 via various means as is known in the art.

The transceiver 1630 is operatively coupled with the processor 1610, and transmits and/or receives a radio signal. The transceiver 1630 includes a transmitter and a receiver. The transceiver 1630 may include baseband circuitry to process radio frequency signals. The transceiver 1630 controls the one or more antennas 1631 to transmit and/or receive a radio signal.

The speaker 1640 outputs sound-related results processed by the processor 1610. The microphone 1641 receives sound-related inputs to be used by the processor 1610.

According to various embodiments, the processor 1610 may be configured to, or configured to control the transceiver 1630 to implement steps performed by the UE and/or the wireless device throughout the disclosure. For example, the processor 1610 may configured to control the transceiver 1630 to receive, from a network, one or more sidelink grants. The processor 1610 may configured to create a data unit based on the one or more sidelink grants. The processor 1610 may configured to control the transceiver 1630 to perform a transmission of the data unit to a second wireless device by using the one or more sidelink grants. The processor 1610 may configured to control the transceiver 1630 to transmit, to the network via PUCCH, a resource request for a retransmission of the data unit based on a QoS requirement for the data unit. The QoS requirement for the data unit may comprise at least one of a required delay of the data unit, a required communication range, or a required error rate. The processor 1610 may configured to control the transceiver 1630 to receive, from the network, one or more sidelink grants for the retransmission of the data unit. The processor 1610 may configured to control the transceiver 1630 to perform the retransmission of the data unit to the second wireless device by using the one or more sidelink grants for the retransmission of the data unit.

According to various embodiments, the processor 1610 may configured to determine whether the QoS requirement of the data unit is satisfied. The processor 1610 may configured to control the transceiver 1630 to transmit, to the network via the PUCCH, the resource request for the retransmission of the data unit based on a determination that the QoS requirement of the data unit is satisfied.

According to various embodiments, the processor 1610 may configured to determine not to transmit the resource request for the transmission of the data unit based on a determination that the QoS requirement of the data unit is not satisfied.

According to various embodiments, the QoS requirement is satisfied based on that a negative acknowledgement (NACK) for a most recent transmission of the data unit is received within {the required delay–a threshold} from a time of an initial transmission of the data unit. The most recent transmission may comprise $n^{th}$ transmission, where the $n^{th}$ transmission is the initial transmission if n=1, and is retransmission if n≥1. Herein, n is a positive integer. The threshold may be configured or signalled by a network to the wireless device via at least one of downlink control information (DCI), a media access control (MAC) control element (MAC CE), or a radio resource control (RRC) signalling. Or, the threshold may be preconfigured.

According to various embodiments, the QoS requirement may be satisfied based on that a PUCCH resource for transmission a scheduling request is available within {the required delay–a threshold} from a time of an initial transmission of the data unit. The threshold may be configured or signalled by a network to the wireless device via at least one of downlink control information (DCI), a media access control (MAC) control element (MAC CE), or a radio resource control (RRC) signalling. Or, the threshold may be preconfigured.

According to various embodiments, the QoS requirement may be satisfied based on that a distance between the first wireless device and the second wireless device is shorter than or equal to the required communication range.

According to various embodiments, the processor 1610 may configured to control the transceiver 1630 to transmit, to the network via the PUCCH, the resource request for the retransmission of the data unit based on at least one of a congestion level or a priority of the data unit. The congestion level may comprise a CBR.

According to various embodiments, the processor 1610 may configured to measure a channel busy ratio (CBR) on sidelink resources. The processor 1610 may configured to control the transceiver 1630 to transmit, to the network via the PUCCH, the resource request for the retransmission of the data unit, based on a determination that the CBR is below or equal to a threshold related to the priority of the data unit.

According to various embodiments, the transmission of the data unit may comprise one or more transmissions of the data unit related to a hybrid automatic repeat request (HARQ) process. The resource request may comprise at least one of a HARQ process identity (ID) of the HARQ process, a requested size of a resource for the retransmission of the data unit, or a requested number of retransmissions of the data unit.

According to various embodiments, the processor 1610 may configured to control the transceiver 1630 to receive, from the second wireless device, an acknowledgement (ACK) for the retransmission of the data unit. The processor 1610 may configured to control the transceiver 1630 to perform a transmission of another data unit to the second wireless device by using remaining grants among the one or more sidelink grants for the retransmission of the data unit after the retransmission is performed.

According to various embodiments, the processor 1610 may configured to control the transceiver 1630 to receive, from the second wireless device, an acknowledgement (ACK) for the retransmission of the data unit. The processor 1610 may configured to release remaining grants among the one or more sidelink grants for the retransmission of the data unit after the retransmission is performed.

Figure 17:
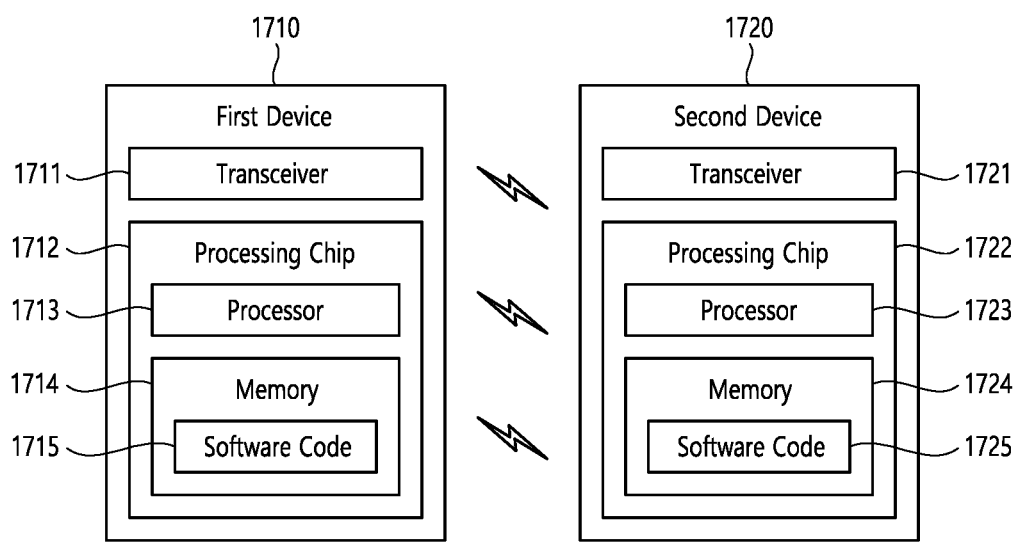
FIG. 17 shows another example of a wireless communication system to which the technical features of the present disclosure can be applied.

FIG. 17 shows another example of a wireless communication system to which the technical features of the present disclosure can be applied.

Referring to FIG. 17, the wireless communication system may include a first device 1710 (i.e., first device 210) and a second device 1720 (i.e., second device 220).

The first device 1710 may include at least one transceiver, such as a transceiver 1711, and at least one processing chip, such as a processing chip 1712. The processing chip 1712 may include at least one processor, such a processor 1713, and at least one memory, such as a memory 1714. The memory may be operably connectable to the processor 1713. The memory 1714 may store various types of information and/or instructions. The memory 1714 may store a software code 1715 which implements instructions that, when executed by the processor 1713, perform operations of the first device 910 described throughout the disclosure. For example, the software code 1715 may implement instructions that, when executed by the processor 1713, perform the functions, procedures, and/or methods of the first device 1710 described throughout the disclosure. For example, the software code 1715 may control the processor 1713 to perform one or more protocols. For example, the software code 1715 may control the processor 1713 to perform one or more layers of the radio interface protocol.

The second device 1720 may include at least one transceiver, such as a transceiver 1721, and at least one processing chip, such as a processing chip 1722. The processing chip 1722 may include at least one processor, such a processor 1723, and at least one memory, such as a memory 1724. The memory may be operably connectable to the processor 1723. The memory 1724 may store various types of information and/or instructions. The memory 1724 may store a software code 1725 which implements instructions that, when executed by the processor 1723, perform operations of the second device 1720 described throughout the disclosure. For example, the software code 1725 may implement instructions that, when executed by the processor 1723, perform the functions, procedures, and/or methods of the second device 1720 described throughout the disclosure. For example, the software code 1725 may control the processor 1723 to perform one or more protocols. For example, the software code 1725 may control the processor 1723 to perform one or more layers of the radio interface protocol.

According to various embodiments, the first device 1710 as illustrated in FIG. 17 may comprise a wireless device. The wireless device may comprise a transceiver 1711, a processing chip 1712. The processing chip 1712 may comprise a processor 1713, and a memory 1714. The memory 1714 may be operably connectable to the processor 1713. The memory 1714 may store various types of information and/or instructions. The memory 1714 may store a software code 1715 which implements instructions that, when executed by the processor 1713, perform operations comprising: receiving, from a network, one or more sidelink grants; creating a data unit based on the one or more sidelink grants; performing a transmission of the data unit to a second wireless device by using the one or more sidelink grants; transmitting, to the network via a physical uplink control channel (PUCCH), a resource request for a retransmission of the data unit based on a quality of service (QoS) requirement of the data unit; receiving, from the network, one or more sidelink grants for the retransmission of the data unit; and performing the retransmission of the data unit to the second wireless device by using the one or more sidelink grants for the retransmission of the data unit.

According to various embodiments, a computer-readable medium having recorded thereon a program for performing each step of a method on a computer is provided. The method comprises: receiving, from a network, one or more sidelink grants; creating a data unit based on the one or more sidelink grants; performing a transmission of the data unit to a second wireless device by using the one or more sidelink grants; transmitting, to the network via a physical uplink control channel (PUCCH), a resource request for a retransmission of the data unit based on a quality of service (QoS) requirement of the data unit; receiving, from the network, one or more sidelink grants for the retransmission of the data unit; and performing the retransmission of the data unit to the second wireless device by using the one or more sidelink grants for the retransmission of the data unit.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 18:
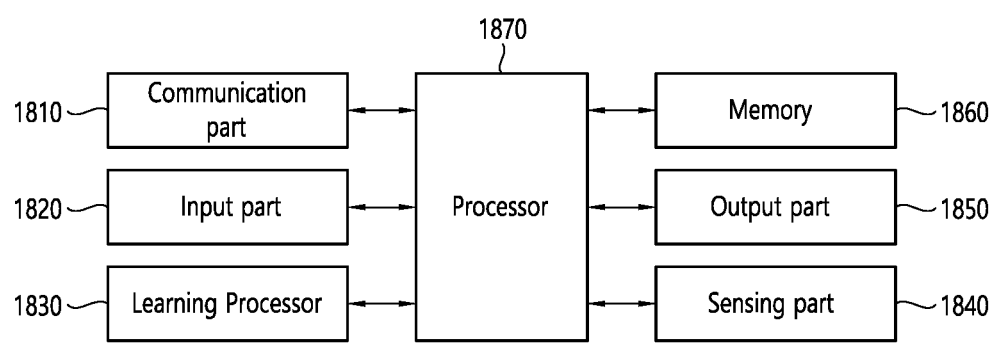
FIG. 18 shows an example of an AI device to which the technical features of the present disclosure can be applied.

FIG. 18 shows an example of an AI device to which the technical features of the present disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
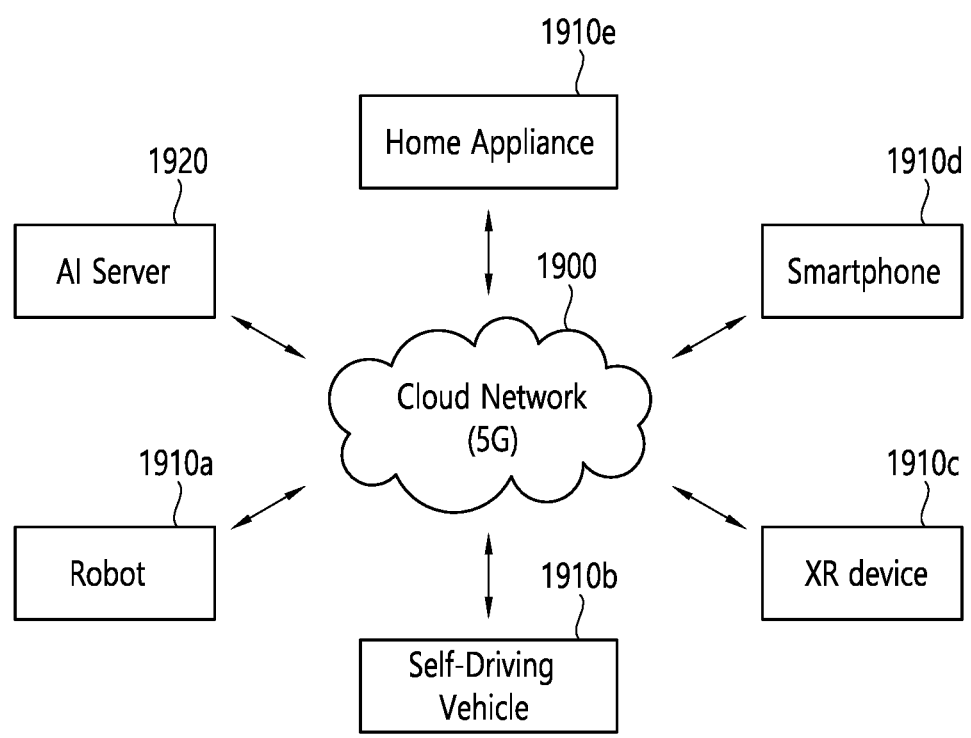
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910a, an autonomous vehicle 1910b, an XR device 1910c, a smartphone 1910d and/or a home appliance 1910e is connected to a cloud network 1900. The robot 1910a, the autonomous vehicle 1910b, the XR device 1910c, the smartphone 1910d, and/or the home appliance 1910e to which the AI technology is applied may be referred to as AI devices 1910a to 1910e.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910a to 1910e and 1920 consisting the AI system may be connected to each other through the cloud network 1900. In particular, each of the devices 1910a to 1910e and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system, i.e. the robot 1910a, the autonomous vehicle 1910b, the XR device 1910c, the smartphone 1910d and/or the home appliance 1910e through the cloud network 1900, and may assist at least some AI processing of the connected AI devices 1910a to 1910e. The AI server 1920 can learn the ANN according to the machine learning algorithm on behalf of the AI devices 1910a to 1910e, and can directly store the learning models and/or transmit them to the AI devices 1910a to 1910e. The AI server 1920 may receive the input data from the AI devices 1910a to 1910e, infer the result value with respect to the received input data using the learning model, generate a response and/or a control command based on the inferred result value, and transmit the generated data to the AI devices 1910a to 1910e. Alternatively, the AI devices 1910a to 1910e may directly infer a result value for the input data using a learning model, and generate a response and/or a control command based on the inferred result value.

Various embodiments of the AI devices 1910a to 1910e to which the technical features of the present disclosure can be applied will be described. The AI devices 1910a to 1910e shown in FIG. 19 can be seen as specific embodiments of the AI device 1800 shown in FIG. 18.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first device configured to operate in a communication system, the method comprising:
   receiving, from a network, one or more first grants for transmission to a second device;
   creating a data unit for transmission to the second device;
   performing a first transmission of the data unit to the second device by based on the one or more first grants;
   after identifying that no acknowledgement for the first transmission is received from the second device, determining whether to transmit, to the network via a resource for uplink control channel, a resource request for a second transmission of the data unit based on a required delay of the data unit, wherein the second transmission is a retransmission for the first transmission;
   transmitting, to the network via the resource for uplink control channel, the resource request for the second transmission of the data unit based on the resource for uplink control channel being within a threshold time earlier than the required delay from the first transmission;
   receiving, from the network, one or more second grants for transmission to the second device; and
   performing the second transmission of the data unit to the second device based on the one or more second grants.

2. The method of claim 1, wherein the transmitting of the resource request comprises transmitting, to the network via the resource for uplink control channel, the resource request for the second transmission of the data unit based on a negative acknowledgement for a most recent transmission of the data unit being received within a threshold time earlier than the required delay from the first transmission.

3. The method of claim 1, wherein the transmitting of the resource request comprises transmitting, to the network via the resource for uplink control channel, the resource request for the second transmission of the data unit based on a distance between the first device and the second device is shorter than or equal to a required communication range.

4. The method of claim 1, wherein the transmitting of the resource request comprises transmitting, to the network via the resource for uplink control channel, the resource request for the second transmission of the data unit based on at least one of a congestion level or a priority of the data unit.

5. The method of claim 4, wherein the transmitting of the resource request comprises:

measuring a channel busy ratio (CBR) on resources for transmission to the second device; and
based on the CBR being below or equal to a threshold related to the priority of the data unit, transmitting, to the network via the resource for uplink control channel, the resource request for the second transmission of the data unit.

6. The method of claim 1, wherein the first transmission is related to a hybrid automatic repeat request (HARQ) process, and wherein the resource request comprises at least one of a HARQ process identity (ID) of the HARQ process, a requested size of a resource for the retransmission of the data unit, or a requested number of retransmissions of the data unit.

7. The method of claim 1, further comprising:
   receiving, from the second device, an acknowledgement for the second transmission; and
   performing a transmission of another data unit to the second device based on remaining grants among the one or more second grants after the second transmission is performed.

8. The method of claim 1, further comprising: receiving, from the second device, an acknowledgement for the second transmission; and
   releasing remaining grants among the one or more second grants after the second transmission is performed.

9. The method of claim 1, wherein the device is in communication with at least one of a user equipment, a network, or autonomous vehicles other than the device.

10. A device in a communication system comprising:
    a transceiver;
    a memory; and
    at least one processor operatively coupled to the transceiver and the memory, wherein the memory stores instructions that, based on being executed by the at least one processor, perform operations comprising:
    receiving, from a network, one or more first grants for transmission to a second device;
    creating a data unit for transmission to the second device;
    performing a first transmission of the data unit to the second device based on the one or more first grants;
    after identifying that no acknowledgement for the first transmission is received from the second device, determining whether to transmit, to the network via a resource for uplink control channel, a resource request for a second transmission of the data unit based on a required delay of the data unit, wherein the second transmission is a retransmission for the first transmission;
    transmitting, to the network via the resource for uplink control channel, the resource request for the second transmission of the data unit based on the resource for uplink control channel being within a threshold time earlier than the required delay from the first transmission;
    receiving, from the network, one or more second grants for transmission to the second device; and
    performing the second transmission of the data unit to the second device based on the one or more second grants.

11. A non-transitory computer-readable medium having recorded thereon a program for performing each step of a method on a computer, the method comprising:
    receiving, from a network, one or more first grants for transmission to a second device;
    creating a data unit for transmission to the second device;
    performing a first transmission of the data unit to the second device based on the one or more first grants;

after identifying that no acknowledgement for the first transmission is received from the second device, determining whether to transmit, to the network via a resource for uplink control channel, a resource request for a second transmission of the data unit based on a required delay of the data unit, wherein the second transmission is a retransmission for the first transmission;

transmitting, to the network via the resource for uplink control channel, the resource request for the second transmission of the data unit based on the resource for uplink control channel being within a threshold time earlier than the required delay from the first transmission;

receiving, from the network, one or more second grants for transmission to the second device; and performing the second transmission of the data unit to the second device based on the one or more second grants.

\* \* \* \* \*